Strong & Dadmun,
Fruit-Stem Cutter.

N° 68,011.    Patented Aug. 20, 1867.

Witnesses.
Samuel N. Piper
G. W. Andrews

Inventors.
A. Strong & J. A. Dadmun.
by their attorney
R. H. Eddy

United States Patent Office.

ALBERT STRONG AND JOSEPH A. DADMUN, OF SOUTH BOSTON, MASSACHUSETTS.

Letters Patent No. 68,011, dated August 20, 1867.

IMPROVEMENT IN FRUIT-STEM CUTTER.

The Schedule referred to in these Letters Patent and making part of the same.

TO ALL PERSONS TO WHOM THESE PRESENTS MAY COME:

Be it known that we, ALBERT STRONG and JOSEPH A. DADMUN, of South Boston, of the county of Suffolk, and State of Massachusetts, have invented a new and useful Fruit-Stem Cutter; and do hereby declare the same to be fully described in the following specification, and represented in the accompanying drawings, of which—

Figure 1:
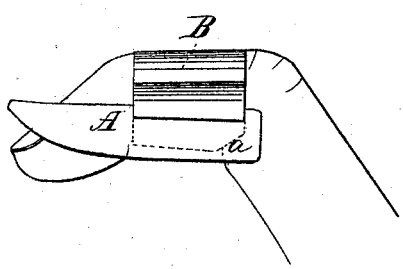
Figure 2:
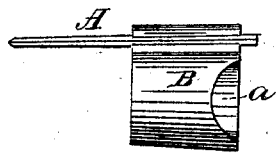
Figure 3:
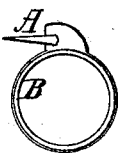

Figure 1 is a plan,
Figure 2 a front elevation, and
Figure 3 an end view of it.

The object of our invention is to enable a person while engaged in gathering grapes or various other fruits to readily sever the stem from the vine or tree while the bunch or fruit may be held in the hand, the said cutting of the stem being effected by the force of the hand which may be hold of the bunch or fruit. To this end and to advantage, two of our said stem cutters may be employed by a person at once, one being placed on the forefinger of each of his hands.

In the drawings, A denotes a blade in shape resembling that of a penknife, it being fastened to a tube, B, to encompass and fit to the forefinger, between its second and third joints, so as to leave the end part and first joint of the finger free to play or move and be used as may be required. The tube we make with a notch or recess, $a$, formed in one side of it, and at its base or larger end, in manner as represented. This notch, while the stem-cutter is being used, rests on the lower part of the finger saddlewise, or receives the flesh of the finger so as to prevent the cutter from turning or revolving on the finger under the pressure exerted on it by the knife.

With this little implement a gardener will find his work of gathering grapes or various other kinds of fruit greatly facilitated, as it enables a bunch to be seized and separated by one hand alone when provided with the implement. We are aware that it is not new to affix a knife to a sewing-thimble. Also, that it is not new to fix a cutter to a common finger-ring, the same to be used for severing a thread extending from an article, or for cutting twine used in binding a bundle. Therefore we do not claim such.

What we claim as our invention, is—

Our said fruit-stem cutter, constructed substantially in manner as represented, and to be used as described, viz, of the blade and tube, connected and arranged as set forth, and the notch formed in the latter, the whole being as and for the purpose specified.

ALBERT STRONG,
JOSEPH A. DADMUN.

Witnesses:
R. H. EDDY,
F. P. HALE, Jr.